UNITED STATES PATENT OFFICE 2,401,080

N-(α-ETHERIFIED-ACETYL) CARBAMIC ACID ESTERS

Lowell B. Kilgore and Karl H. Weber, Washington, D. C., assignors to Kilgore Development Corporation, Washington, D. C., a corporation of Virginia No Drawing. Application March 5, 1945, Serial No. 581,170

28 Claims. (Cl. 167—22)

The invention described herein relates to new organic compounds, more particularly to a new class of N-substituted carbamic acid esters and specifically to N-(α-etherified-acetyl) carbamic acid esters.

An object of the present invention is to provide new and useful compounds of the general formula:

$$R-O-CH_2CO-NHCOOR'$$

wherein R represents a radical selected from the group consisting of alkyl, aryl, aralkyl, cycloalkyl and heterocyclic radicals and R' represents a radical selected from the group consisting of alkyl, aryl, aralkyl, cycloalkyl and heterocyclic radicals and radicals of the type R''—O—X— wherein X is alkylene and R'' is a hydrocarbon group. A further object of this invention is the provision of a process for the preparation of these N-(α-etherified-acetyl) carbamic acid esters. Still a further object of this invention is the preparation of new chemicals suitable for combating insects. Other objects and advantages of this invention will appear hereinafter.

These objects are accomplished by the following invention wherein N-(α-etherified-acetyl) carbamic acid esters are prepared by reacting the acyl halide of an α-etherified acetic acid with an ester of carbamic acid as follows:

$$ROCH_2COCl + H_2NCOOR' \rightarrow ROCH_2CONH_2COOR' + HCl$$

R and R' may be the same or different organic radicals.

The esters of carbamic acid which are used as starting materials may be made by any one of several known methods, for example, by heating urea with the appropriate alcohol (Organic Syntheses, Coll., vol. I, pp. 140-141) or by an exchange reaction in which urethane is refluxed with a high boiling alcohol. Similarly the acyl halides of the α-etherified acetic acids employed in this invention may be prepared in known manner.

The new compounds of this invention are obtained by heating together a carbamic acid ester and the acyl halide of an α-etherified acetic acid over varying periods of time depending on the reactivities of the individual components of the reaction mixture. Where necessary a suitable inert diluent such as benzene or toluene may be used. To facilitate the removal of HCl suitable organic bases such as pyridine, piperidine and the like may be added to the reaction mixture.

The more detailed practice of the invention is illustrated by the following examples which, however, do not limit the scope of the invention in any way.

EXAMPLE 1

PREPARATION OF BUTYL N-BUTOXYACETYL CARBAMATE 130 grams of thionyl chloride were added to 132 grams (one mol) of butoxyacetic acid dissolved in 100 cc. of dry benzene. After refluxing until reaction was complete, the benzene and excess thionyl chloride were distilled off. The butoxyacetyl chloride obtained in this manner was diluted with benzene. 120 grams of butyl carbamate were added and the reaction mixture was refluxed for two days after which time evolution of HCl gas had ceased. The resulting mixture was washed with water, neutralized with a solution of NaHCO₃ and again washed with water. The washed benzene solution was then fractionally distilled under reduced pressure. 142 grams of product boiling at 115-20°/2mm. was obtained.

EXAMPLE 2

PREPARATION OF ISOAMYL N-BUTOXYACETYL CARBAMATE

Butoxyacetyl chloride was prepared by refluxing 32 grams of butoxyacetic acid with 30 grams of thionyl chloride in 25 cc. dry benzene until reaction was complete. The solvent and excess thionyl chloride were distilled off. 32 grams of isoamyl carbamate and 25 cc. dry benzene were added to the butoxyacetyl chloride and the mixture refluxed for two days. The reaction product was diluted with benzene, washed twice with saturated sodium bicarbonate solution and twice with water. After fractional distillation under reduced pressure, 30 grams of isoamyl N-butoxyacetyl carbamate boiling at 132-6°/2mm. were obtained.

EXAMPLE 3

PREPARATION OF PROPYL N-OCTOXYACETAL CARBAMATE

Octoxyacetyl chloride was prepared by refluxing 13.2 grams of octoxyacetic acid with 8.4 grams of thionyl chloride in benzene. Excess thionyl chloride was distilled off together with some solvent and 7.2 grams of propyl carbamate was added. The mixture was refluxed for 18 hours, washed with water, then saturated sodium bicarbonate solution, water again and then distilled under reduced pressure. 8 grams of product boiling at 140–1°/1mm. were obtained.

EXAMPLE 4

PREPARATION OF OCTYL N-TETRAHYDROFURFUROXY-ACETYL CARBAMATE

Tetrahydrofurfuroxyacetyl chloride was prepared by refluxing 12 grams of tetrahydrofurfuroxyacetic acid with 9 grams of thionyl chloride dissolved in benzene. Excess thionyl chloride was distilled off together with some solvent and 12.5 grams of n-octyl carbamate was added. The mixture was refluxed for 12½ hours, washed with water, then saturated sodium bicarbonate solution, water again, and then distilled. 16 grams of product boiling at 152–72°/1mm. were obtained.

EXAMPLE 5

PREPARTION OF ETHYL N-PHENETHOXYACETYL CARBAMATE

Phenethoxyacetyl chloride was prepared by refluxing 12.6 grams of phenethoxyacetic acid with 8.4 grams of thionyl chloride dissolved in benzene. Excess thionyl chloride was distilled off with some solvent and 6.2 grams of ethyl carbamate was added. The mixture was refluxed for 16 hours. After washing as in previous examples, the mixture was distilled under reduced pressure. 7 grams of product boiling at 170–5°/1mm. were obtained.

EXAMPLE 6

PREPARATION OF B-ETHOXYETHYL N-BUTOXY-ACETYL CARBAMATE

Butoxyacetyl chloride was prepared by refluxing 13.2 grams of butoxyacetic acid with 12 grams thionyl chloride dissolved in benzene. Excess thionyl chloride was distilled off with some solvent and 13.3 grams of B-ethoxyethyl carbamate was added. The mixture was refluxed for 17½ hours. After washing as in previous examples the mixture was distilled under reduced pressure. 8 grams of product boiling at 175–7°/18mm. were obtained.

Other members of the new series of N-α-etherified-acetyl carbamic acid esters which we have prepared by the method set out in the aforedescribed examples are:

Cyclohexyl N-butyoxyacetyl carbamate
Tetrahydrofurfuryl N-butoxyacetyl carbamate
Phenethyl N-butoxyacetyl carbamate
Butyl N-B-naphthoxyacetyl carbamate
Amyl N-phenoxyacetyl carbamate
Phenethyl N-p-chlorophenoxyacetyl carbamate
Dodecyl N-cyclohexoxyacetyl carbamate
Isoamyl N-cyclohexoxyacetyl carbamate
Dodecyl N-ethoxyacetyl carbamate
Butyl N-2,3,4,6-tetrachlorophenoxyacetyl carbamate
Butyl N-lauroxyacetyl carbamate
Phenyl butoxyacetyl carbamate
B-ethoxyethyl N-butoxyacetyl carbamate
B-butoxyethyl N-butoxyacetyl carbamate
B-phenoxyethyl N-phenoxyacetyl carbamate
B-benzoxyethyl N-cyclohexoxyacetyl carbamate The new N-(α-etherified-acetyl) carbamic acid esters as a class possess valuable insect combating properties. When applied in the form of a lotion, spray, cream or salve, they effectively repel such dangerous and annoying pests as flies and mosquitoes.

Table I demonstrates the effectiveness of representative members of this new series of organic compounds against the common house fly. The test procedure used was the "sandwich bait" method substantially as described in Soap, June, 1939, page 103. A coating of molasses was applied to one side of a strip of blotting paper and dried to a hard, glossy surface. It was covered with a strip of thin, porous tissue which had previously been immersed in a 4 percent solution in alcohol of the compound to be tested and then dried until the alcohol had evaporated. The concentration of the test solutions was reduced to 4 percent because the repellency of certain members of the series was so prolonged that the flies were in danger of dying before completion of the test. For comparison purposes one strip was treated only with solvent. The strips prepared in this fashion were mounted on a board and introduced into a large cage containing more than 2000 hungry houseflies. By making readings at intervals, the duration of repellency, namely, the time which elapsed before the flies began to feed on the molasses through the treated tissue covers was observed.

Table I

[Duration of repellency to houseflies possessed by N-(α-etherified-acetyl) carbamic acid esters in 4 percent concentration.]

| Compound | Duration of repellency |
| --- | --- |
| Butyl N-butoxyacetyl carbamate | 10 hours.[1] |
| Isoamyl N-butoxyacetyl carbamate | 6 hrs., 50 min.[1] |
| Cyclohexyl N-butoxyacetyl carbamate | 3 hrs., 10 min. |
| Tetrahydrofurfuryl N-butoxyacetyl carbamate | 1 hr. |
| Propyl N-octoxyacetyl carbamate | 6 hrs., 45 min.[1] |
| Ethyl N-phenethoxyacetyl carbamate | 4 hrs., 10 min.[1] |
| Octyl N-tetrahydrofuruforoxyacetyl carbamate | 2 hrs. |
| Isoamyl N-cyclohexoxyacetyl carbamate | 2 hrs., 10 min. |
| B-ethoxyethyl N-butoxyacetyl carbamate | 6 hrs., 25 min.[1] |
| B-butoxyethyl N-butoxyacetyl carbamate | 9 hrs. |

[1] Bait still untouched at end of this period. Test terminated to feed flies.

EXAMPLE 7

Butyl N-butoxyacetyl carbamate, when applied to the forearm of an individual, retained its repellency to Aedes aegypti mosquitoes for 202 minutes.

It has been observed, furthermore, that the compounds of the present invention possess a lethal action when applied to houseflies in the form of a spray. They are particularly effective as paralytic agents.

The various N-(α-etherified-acetyl) carbamic acid esters may be used direct. Effective lotions may also be prepared by dissolving these compounds in alcohol. Other diluents may also be used such as aqueous alcohol, isopropanol and dimethyl phthalate. These new compounds may also be dissolved in hydrocarbon oils such as kerosene, in which form they are particularly useful as cattle sprays.

Although this invention has been described with reference to preferred illustrative embodiments thereof it will be apparent to those skilled in the art that the principles of this invention may be embodied in other forms but within the scope of the appended claims.

What we claim is:

1. The N-(α-etherified-acetyl) carbamic acid esters having the general formula:

ROCH$_2$CONHCOOR' wherein R represents a radical selected from the group consisting of alkyl, aryl, aralkyl, cycloalkyl and heterocyclic radicals; and R' represents a radical selected from the group consisting of alkyl, aryl, aralkyl, cycloalkyl and heterocyclic radicals and radicals of the type R''—O—X— wherein X is alkylene and R'' is a hydrocarbon group.

2. The N-alkoxyacetyl carbamic acid esters having the general formula:

Alk—O—CH₂CONHCOOR' wherein alk is alkyl and R' represents a radical selected from the group consisting of alkyl, aryl, aralkyl, cycloalkyl and heterocyclic radicals and radicals of the type R''—O—X— wherein X is alkylene and R'' is a hydrocarbon group.

3. The N-butoxyacetyl carbamic acid esters having the general formula:

C₄H₉OCH₂CONHCOOR' wherein R' represents a radical selected from the group consisting of alkyl, aryl, aralkyl, cycloalkyl and heterocyclic radicals and radicals of the type R''—O—X— wherein X is alkylene and R'' is a hydrocarbon group.

4. Butyl N-butoxyacetyl carbamate.
5. Isoamyl N-butoxyacetyl carbamate.
6. Propyl N-octoxyacetyl carbamate.

7. The process of preparing N-(α-etherified-acetyl) carbamic acid esters which comprises reacting the acyl halide of an α-etherified acetic acid with a carbamic acid ester.

8. The process of preparing N-butoxyacetyl carbamic acid esters which comprises reacting the acyl halide of butoxyacetic acid with a carbamic acid ester.

9. An insect combative composition containing as an essential active ingredient an N-(α-etherified-acetyl) carbamic acid ester having the general formula:

ROCH₂CONHCOOR' wherein R represents a radical selected from the group consisting of alkyl, aryl, aralkyl, cycloalkyl, and heterocyclic radicals; and R' represents a radical selected from the group consisting of alkyl, aryl, aralkyl, cycloalkyl and heterocyclic radicals and radicals of the type R''—O—X— wherein X is alkylene and R'' is a hydrocarbon group.

10. An insect combative composition containing a N-(α-etherified-acetyl) carbamic acid ester having the general formula:

ROCH₂CONHCOOR' wherein R represent a radical selected from the group consisting of alkyl, aryl, aralkyl, cycloalkyl and heterocyclic radicals; and R' represents a radical selected from the group consisting of alkyl, aryl, aralkyl, cycloalkyl and heterocyclic radicals and radicals of the type R''—O—X— wherein X is alkylene and R'' is a hydrocarbon group, and a carrier therefor.

11. An insect combative composition containing as an essential active ingredient an N-alkoxyacetyl carbamic acid ester having the general formula:

Alk—O—CH₂CONHCOOR' wherein alk is alkyl and R' represents a radical selected from the group consisting of alkyl, aryl, aralkyl, cycloalkyl and heterocyclic radicals and radicals of the type R''—O—X— wherein X is alkylene and R'' is a hydrocarbon group.

12. An insect combative composition containing as an essential active ingredient an N-alkoxyacetyl carbamic acid ester having the general formula:

Alk—O—CH₂CONHCOOR' wherein alk is alkyl and R' represents a radical selected from the group consisting of alkyl, aryl, aralkyl, cycloalkyl and heterocyclic radicals and radicals of the type R''—O—X— wherein X is alkylene and R'' is a hydrocarbon group and a carrier therefor.

13. An insect combative composition containing as an essential active ingredient an N-butoxyacetyl carbamic acid ester having the general formula:

C₄H₉OCH₂CONHCOOR' wherein R' represents a radical selected from the group consisting of alkyl, aryl, aralkyl, cycloalkyl and heterocyclic radicals and radicals of the type R''—O—X— wherein X is alkylene and R'' is a hydrocarbon group.

14. An insect combative composition containing an N-butoxyacetyl carbamic acid ester having the general formula:

C₄H₉OCH₂CONHCOOR' wherein R' represents a radical selected from the group consisting of alkyl, aryl, aralkyl, cycloalkyl and heterocyclic radicals and radicals of the type R''—O—X— wherein X is alkylene and R'' is a hydrocarbon radical and a carrier therefor.

15. An insect combative composition containing as an essential active ingredient butyl N-butoxyacetyl carbamate.

16. An insect combative composition containing butyl N-butoxyacetyl carbamate and a carrier therefor.

17. An insect combative composition containing as an essential active ingredient isoamyl N-butoxyacetyl carbamate.

18. An insect combative composition containing isoamyl N-butoxyacetyl carbamate and a carrier therefor.

19. An insect combative composition containing as an essential active ingredient propyl N-octoxyacetyl carbamate.

20. An insect combative composition containing propyl N-octoxyacetyl carbamate and a carrier therefor.

21. An insect combative composition containing as an essential active ingredient an N-(α-etherified-acetyl) carbamic acid ester having the general formula:

ROCH₂CONHCOOR' wherein R represents a radical selected from the group consisting of alkyl, aryl, aralkyl, cycloalkyl and heterocyclic radicals; and R' represents a radical selected from the group consisting of alkyl, aryl, aralkyl, cycloalkyl and heterocyclic radicals and radicals of the type R''—O—X— wherein X is alkylene and R'' is a hydrocarbon group dissolved in aqueous alcohol.

22. An insect combative composition containing as an essential active ingredient an N-(α-etherified-acetyl) carbamic acid ester having the general formula:

ROCH₂CONHCOOR' wherein R represents a radical selected from the group consisting of alkyl, aryl, aralkyl, cycloalkyl and heterocyclic radicals; and R' represents a radical selected from the group consisting of alkyl, aryl, aralkyl, cycloalkyl and heterocyclic radicals and radicals of the type R''—O—X— wherein X is alkylene and R'' is a hydrocarbon group dissolved in a hydrocarbon solvent.

23. The process of combating insects which comprises subjecting them to the action of an N-(α-etherified-acetyl) carbamic acid ester having the general formula:

ROCH₂CONHCOOR' wherein R represents a radical selected from the group consisting of alkyl, aryl, aralkyl, cycloalkyl and heterocyclic radicals; and R' represents a radical selected from the group consisting of alkyl, aryl, aralkyl, cycloalkyl and heterocyclic radicals and radicals of the type R''—O—X— wherein X is alkylene and R'' is a hydrocarbon group.

24. The process of combating insects which comprises subjecting them to the action of an N-alkoxyacetyl carbamic acid ester having the general formula:

Alk—O—CH₂CONHCOOR' wherein alk is alkyl and R' represents a radical selected from the group consisting of alkyl, aryl, aralkyl, cycloalkyl and heterocyclic radical and radicals of the type R''—O—X— wherein X is alkylene and R'' is a hydrocarbon group.

25. The process of combating insects which comprises subjecting them to the action of an N-butoxyacetyl carbamic acid ester having the general formula:

C₄H₉OCH₂CONHCOOR' wherein R' represents a radical selected from the group consisting of alkyl, aryl, aralkyl, cycloalkyl and heterocyclic radicals and radicals of the type R''—O—X— wherein X is a hydrocarbon group.

26. The process of combating insects which comprises subjecting them to the action of butyl N-butoxyacetyl carbamate.

27. The process of combating insects which comprises subjecting them to the action of isoamyl N-butoxyacetyl carbamate.

28. The process of combating insects which comprises subjecting them to the action of propyl N-octoxyacetyl carbamate.

LOWELL B. KILGORE.
KARL H. WEBER.